United States Patent [19]

Ushikubo et al.

[11] Patent Number: 4,987,938
[45] Date of Patent: Jan. 29, 1991

[54] PNEUMATIC TIRES INCLUDING SPIRALLY WOUND AUXILIARY LAYER OUTSIDE BELT

[75] Inventors: Hisao Ushikubo, Kodaira; Toru Tsuda, Higashimurayama; Ichiro Takahashi, Niiza, all of Japan

[73] Assignee: Bridgestone Corporation, Tokyo, Japan

[21] Appl. No.: 358,522

[22] Filed: May 30, 1989

Related U.S. Application Data

[63] Continuation of Ser. No. 41,040, Apr. 22, 1987, abandoned.

[30] Foreign Application Priority Data

Apr. 22, 1986 [JP] Japan .................................. 61-94240

[51] Int. Cl.$^5$ ............................ B60C 9/22; B60C 9/26
[52] U.S. Cl. .................................... 152/528; 152/531; 152/533; 152/538
[58] Field of Search ............... 152/528, 531, 526, 529, 152/533, 535, 538; 156/117

[56] References Cited

U.S. PATENT DOCUMENTS

| | | | |
|---|---|---|---|
| 3,503,432 | 3/1970 | Maiocchi | 152/531 X |
| 3,776,792 | 12/1973 | Grawey | 156/117 X |
| 4,135,566 | 1/1979 | Senger et al. | 152/531 X |
| 4,183,391 | 1/1980 | Romano | 152/527 X |
| 4,258,774 | 3/1981 | Mirtain et al. | 152/528 X |
| 4,293,019 | 10/1981 | Maiocchi | 152/531 X |

FOREIGN PATENT DOCUMENTS

| | | | |
|---|---|---|---|
| 276392 | 9/1965 | Australia | 152/531 |
| 1487426 | 9/1977 | United Kingdom | 152/531 |
| 2021051 | 11/1979 | United Kingdom | 152/528 |

Primary Examiner—Michael W. Ball
Assistant Examiner—Geoffrey L. Knable
Attorney, Agent, or Firm—Sughrue, Mion, Zinn, Macpeak & Seas

[57] ABSTRACT

Pneumatic tires are disclosed, which each comprise a pair of beads, a toroidal carcass composed of at least one carcass ply which extends between the beads and is composed of cords arranged substantially in a radial direction of the tire, a belt layer superimposed radially outside a crown portion of the carcass, a tread arranged radially outside of the belt layer to cover the belt layer, and an auxiliary layer which is arranged between the tread and the belt layer to cover the whole belt layer and is composed of an organic fiber cord arranged substantially in parallel with the tire circumferential direction. The tread is constituted by a tread central portion containing a tire equatorial plane, a pair of tread side edge portions covering the side edges of the belt layer, and a pair of tread intermediate portions between the tread central portion and the tread side edge portions. The auxiliary layer comprises a plurality of plies at at least widthwise opposite side edge portions, and is constituted by a continuous cord member comprising at least one rubberized cord which is spirally wound in the tire circumferential direction. The opposite ends of the cord member of the auxiliary layer are located radially inside the tread intermediate portion or portions of the tread.

7 Claims, 3 Drawing Sheets

PNEUMATIC TIRES INCLUDING SPIRALLY WOUND AUXILIARY LAYER OUTSIDE BELT

This is a continuation of Ser. No. 07/041,040, filed on Apr. 22, 1987.

BACKGROUND OF THE INVENTION (1) Field of the Invention

The present invention relates to an improvement for high speed durability of pneumatic tires, for instance, high performance low profile pneumatic tires adapted to run at high speeds.

(2) Related Art Statement

In general, high performance low profile pneumatic tires of this type have a so-called aspect ratio [(a tire section height "H")÷(a tire section width "S")] in a range of 0.35 to 0.6, and each have a belt reinforcing structure in which an auxiliary layer is provided between a belt layer and a tread to cover the belt layer especially for improving high speed durability. As conventional belt reinforcing structures, there are belt reinforcing structures as shown in FIGS. 6 and 7. In tires having such belt reinforcing structures, the other construction is the same as that of ordinary pneumatic radial tires.

The belt reinforcing structure 1 shown in FIG. 6 uses, as a belt 2, rubberized cords such as steel cords or organic fiber cords having a high modulus of elasticity. Auxiliary layers 5-1 and 5-2 so called cap layers or strip layers are provided between the belt 2 and a tread, not shown, to cover the belt 2. Each of the auxiliary layers 5-1 and 5-2 is formed by spirally and intimately winding a single rubberized organic thermally shrinkable fiber cord 7 (for instance, a nylon cord) substantially in parallel to a tire circumferential direction, and is arranged in such an area as to cover at least tire widthwise edge portions $2a$ of the belt layer 2. The auxiliary layers 5-1 and 5-2 shown in FIG. 6 are cap layers covering the entire belt layer 2 between the opposite edge portions $2a$. Alternatively, strip layers (not shown) covering near the edge portions $2a$ only may be used solely or in combination with a cap layer as mentioned above. As shown in FIG. 6, the cords are conventionally spirally wound in a double layer construction such that the cord has a starting end $7a$ in the vicinity of one edge portion $2a$ of the belt layer 2 and a terminal end $7b$ near the other edge portion $2a$ of the belt layer 2. Alternatively, as shown in FIG. 7, there is a tire in which cords 7 are arranged such that a starting end $7a$ of the cord 7 is positioned at one of the edge portions or a central portion $2b$ of a belt 2, and a terminal end $7b$ is positioned at the central portion $2b$ or the other edge portion $2a$ of the belt 2.

However, when a low profile high performance tire having the starting end $7a$ or the terminal end $7b$ of the cord 7 arranged near the central portion $2b$ of the belt 2 runs at high speeds, the tread central portion undergoes such a large repeated deformation strain in that it is swelled outwards in a tire radial direction due to a centrifugal force and is deformed inwards in the radial direction under a high ground contact pressure at a ground contacting area. Ultimately, a rubber surrounding the starting end $7a$ or the terminal end $7b$ is fatigued and peeled, thereby conspicuously deteriorating high speed durability.

Further, when a tire having the starting end $7a$ or the terminal end $7b$ of the cord located near the edge portion $2a$ of the belt 2 rounds a curve at high speeds, the starting end $7a$ or the terminal end $7b$ undergoes a large repeated deformation strain, so that the surrounding rubber is fatigued to ultimately cause peeling thereof.

SUMMARY OF THE INVENTION

Under the circumstances, an object of the present invention is to prevent occurrence of a large deformation strain exerting upon a starting end and a terminal end of a cord constituting an auxiliary layer or layers and prevent the above peeling trouble, and to provide pneumatic tires having excellent durability at high speeds.

According to the present invention, there is a provision of pneumatic tires which each comprise a pair of beads, a toroidal carcass composed of at least one carcass ply which extends between the beads and is composed of cords arranged substantially in a radial direction of the tire, a belt layer arranged radially outward a crown portion of the carcass, a tread arranged radially outward the belt layer to cover the belt layer, and an auxiliary layer which is arranged between the tread and the belt layer to cover the whole belt layer and is composed of an organic fiber cord arranged substantially in parallel to a tire circumferential direction, wherein the tread is constituted by a tread central portion containing a tire equatorial plane, a pair of tread side edge portions covering side edge portions of the belt layer, and a pair of tread intermediate portions between the tread central portion and the tread side edge portions, the auxiliary layer has a plurality of plies at at least widthwise opposite side edge portions and is constituted by a continuous cord member comprising at least one rubberized cord which is spirally wound in the tire circumferential direction, and the opposite ends of the cord member of the auxiliary layer are located corresponding to the tread intermediate portion or portions.

According to the present invention, the peeling trouble of a rubber surrounding the opposite end portions of the cord in the auxiliary layer at high speed running can be prevented, and durability at high speeds can be largely improved.

These and other objects, features and advantages of the invention will be appreciated upon reading of the following description of the invention when taken in conjunction with the attached drawings, with the understanding that some modifications, variations and changes of the same could be made by a skilled person in the art to which the invention pertains without departing from the spirit of the invention or the scope of claims appended hereto.

BRIEF DESCRIPTION OF THE DRAWINGS

For a better understanding of the invention, reference is made to the attached drawings, wherein.

DETAILED DESCRIPTION OF THE INVENTION

Figure 1:
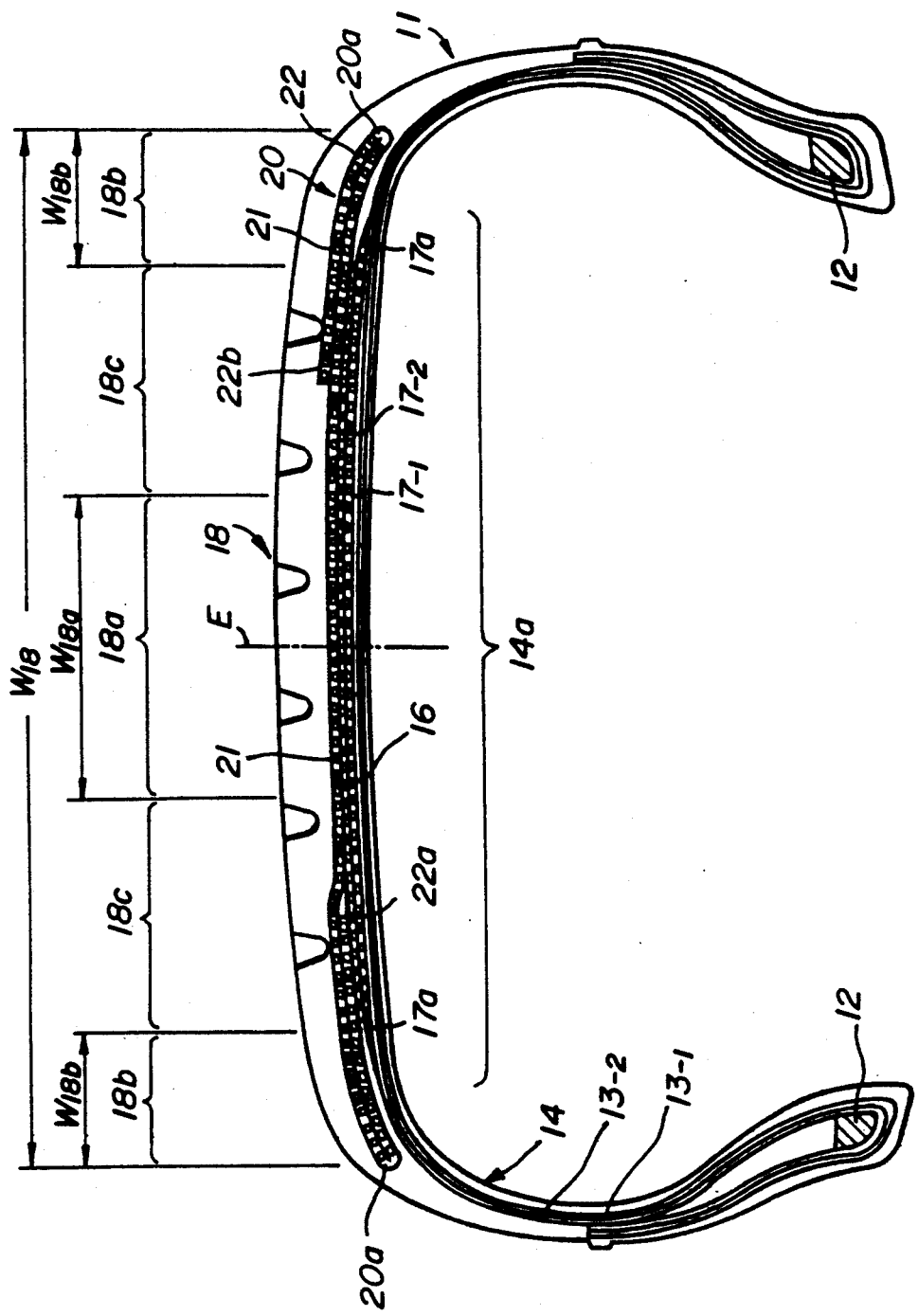
FIGS. 1 through 3 are views illustrating a first embodiment of the pneumatic tire according to the present invention, FIG. 1 being a sectional view thereof, FIG. 2 being a conceptual view illustrating an arrangement of an auxiliary layer, and FIG. 3 being an enlarged sectional view of a ribbon-like cord member.

In this application, the tread central portion is intended to mean a tread portion having 30% of the whole tread width in an axial direction and being centered in the tire equatorial plane, and the tread side edge portions are each to mean a tread portion having 15% of the whole tread width in the axial direction and being centered in the side edge of the belt layer, while the tread intermediate portions are each intended to mean a tread portion between the tread central portion and the tread side edge portion.

The reason why the ends of the cord of the auxiliary layer need to be located radially inside the tread intermediate portion or portions is that a deformation strain occurring at the end portions of the cord during tire running and corner-rounding at high speeds is minimum when the ends of the cord are located at the tread intermediate portion or portions. In the case where the tread is provided with a plurality of land portions and circumferential grooves, it is preferable that the ends of the cord are located radially inside the land portion or portions, that is, a tread portion or portions excluding the circumferential grooves.

Further, the cord ends are preferably arranged radially inside the tread intermediate portion or portions and in the substantially middle between the side edge or edges of the belt and the tire equatorial plane. Moreover, it is preferable to use, as the cord constituting the auxiliary layer, a ribbon-like cord member containing from two to twelve rubberized thermally shrinkable cords represented by nylon.

In the pneumatic tire according to the present invention, the auxiliary layer is constituted by a spirally wound organic fiber cord, and ends of the cord are arranged radially inside the tread intermediate portion or portions. The auxiliary layer is formed by spirally winding the cord member from its one end located axially inside of the tread side edge portion as a starting point toward one of the opposite side edges of the auxiliary layer in the axial direction. When the spirally wound cord member reaches one of the opposite side edges, it is turned back and then spirally wound toward the other opposite side edge of the auxiliary layer. When the spirally wound cord member reaches the other opposite side edge, it is turned back and then spirally wound until the cord member reaches a location which is symmetrical with the starting point through the tire equatorial plane or until the continuous cord member reaches substantially the staring point. Therefore, a deformation strain applied to the end portions of the cord is extremely small and therefore the surrounding rubber will not be almost fatigued. Consequently, unlike the prior art pneumatic tires, there is no fear that the cord end portions undergo a large repeated deformation strain due to a centrifugal force and a high ground contact pressure at the tread central portion and the rubber surrounding the cord end portions is fatigued and peeled. Further, there is no fear that the cord end portions receive a large repeated deformation strain radially inside the tread side edge portions and the surrounding rubber is peeled.

Specific embodiments according to the present invention will now be explained with reference to the attached drawings.

Figure 2:
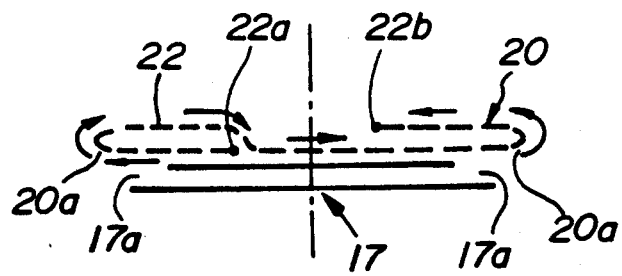
Figure 3:
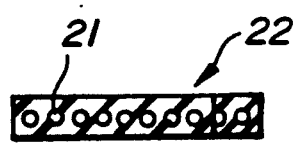

In FIGS. 1 through 3 is shown a first embodiment of the pneumatic tire according to the present invention.

The pneumatic tire 11 shown in FIG. 1 is a high performance tire having a tire size of 235/45 VR17 and an aspect ratio of about 0.45. The pneumatic tire 11 comprises a pair of beads 12, a toroidal carcass 14 which extends between the beads 12 and is composed of rayon cord plies 13-1 and 13-2 (a fineness of 1650 d/2) arranged in the substantially tire radial direction, a belt 17 of two belt layers 17-1 and 17-2 which are arranged radially outside a crown portion 14a of the carcass 14 in a substantially equal width as that of the tread and are composed of steel cords 16 arranged at an angle of 20° with respect to the equatorial plane E of the tire while intersecting with those of the adjacent belt layer, a tread 18 arranged radially outside the belt layer 17-2 to cover the belt layer 17-2, and an auxiliary layer 20 which is arranged between the tread 18 and the belt layer 17-2 to cover side edges 17a of the belt layers 17-1 and 17-2 and includes nylon cords (a fineness of 1260 d/2) arranged substantially in parallel with the tire circumferential direction. The tread 18 is constituted by a tread central portion 18a having a width "$W_{18a}$" (6.6 cm) corresponding to 30% of the whole tread width $W_{18}$ (22 cm) and being centered in the equatorial plane E, tread side edge portions 18b each having a width "$W_{18b}$" (3.3 cm) corresponding to 15% of the tire tread width $W_{18}$ in the tire axial direction. The side edges 17a of the belt layers 17, are centered in the tread side edge portions. The tread intermediate portions 18c are located between the tread central portion 18a and the tread side edge portions 18b.

In the illustrated embodiment, the auxiliary layer 20 is constituted by a ribbon-like cord member 22 (see FIG. 3) of a width of about 10 mm which is composed of rubberized ten nylon cords 21 (a fineness of 1260 d/2) arranged in parallel (see FIG. 3). A starting end 22a at which the ribbon-like cord member 22 begins to be wound and a terminal end 22e at which the ribbon-like cord member 22 terminates in winding are located radially inside a pair of the intermediate portions of the tread 18, respectively. That is, starting from one of the tread intermediate portions 18c at which the starting end 22a is located, the band-like member 22 is wound spirally in the tire circumferential direction and intimately continuously in the axial direction up to one of the side edges 20a of the auxiliary layer 20 to cover the side edge 17a of the belt layers 17-1 and 17-2. Then, the ribbon-like cord member 22 is turned up and piled one upon another at the side edge 20a and wound in a double layer construction, and then wound, in a single construction, radially inside of the tread central portion 18a. Further, the ribbon-like member 22 is further wound up to the other side edge 20a of the auxiliary layer 20 and turned up one upon another and wound in a double layer construction to locate the terminal end 22b radially inside the other intermediate portion 18c. The starting end 22a and the terminal end 22b of the ribbon-like member 22 are both located radially inside the tread intermediate portions 18c and substantially in the middle between the side edges 17a of the belt layers 17-1 and 17-2 and the tire equatorial plane E. The starting end 22a and the terminal end 22b of the ribbon-like member are cut at an angle of 30° with respect to the equatorial plane E, and each of their cut tips is arranged in an intimate relation with the widthwise adjacent ribbon-like cord member portion. The above-mentioned cut angle is preferably in a range from 20° to 60°.

Next, a second embodiment according to the present invention will be explained below.

Figure 4:
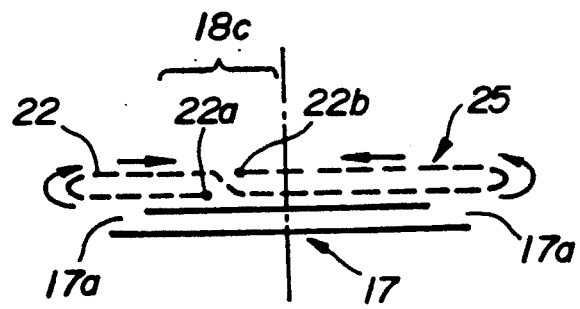
FIGS. 4 and 5 are conceptual views showing other arrangements of an auxiliary layer in second and third embodiments of the pneumatic tire according to the present invention.

In the second embodiment of the pneumatic tire of FIG. 4 according to the present invention, as similarly in the first embodiment, starting from the starting end 22a located radially inside one of the intermediate portions 18c, the ribbon-like cord member 22 of the auxiliary layer 25 is wound, as shown by arrows in FIG. 4, to cover one of side edges 17a of the belt layers, and then turned up and wound in a double layer construction. Then, the ribbon-like member is wound in a ∞ shape in section to locate the terminal end 22b radially inside the above tread intermediate portion 18c. The other arrangement is the same as in the first embodiment. In FIG. 4, the same reference numerals are given to the same portions as in FIG. 1.

Next, a third embodiment according to the present invention will be explained below.

Figure 5:
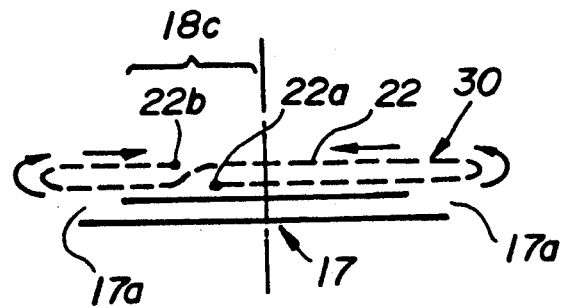
Figure 6:
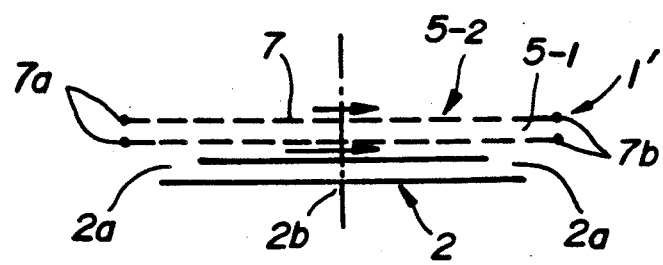
FIGS. 6 and 7 are conceptual views showing arrangements of auxiliary layers of prior art pneumatic tires.

In the third embodiment of FIG. 5 according to the present invention, as in the same with the second embodiment, the starting end 22a and the terminal end 22b of a ribbon-like cord member 22 are located radially inside one of the tread intermediate portions 18c. The ribbon-like cord member begins to be wound from a portion radially inside one of tire intermediate portions 18c, and as shown by arrows in FIG. 5, the ribbon-like cord member is wound to cover the other side edge 17a of the belt layers. Then, it is turned up and wound in a double layer construction, and then further continues to be wound in a ∞ shape in section to locate the terminal end 22b radially inside the above tread intermediate portion 18c. The other arrangement is the same as in the second embodiment. In FIG. 5, the same reference numerals are given to the same portions as in the second embodiment.

Next, two kinds of test tires (a tire size of 235/45 VR 17) (a tire corresponding to the first embodiment and a comparative tire) were prepared to confirm effects of the present invention. The comparative tire is a tire shown in FIG. 7 as a prior art technique, and has the same construction as that of the test tire according to the present invention excluding the auxiliary layer.

In the test, a high speed durability performance was compared under ordinary testing conditions (a rim used: 8–17 inches, an inflation pressure: 3.0 kg/cm², an applied load: 300 kg, and a running speed: increased at a specific running condition from a running speed of 100 km/H) by using a high speed drum tester, and trouble-occurring states were compared.

Test results are shown in the following table. The high speed durability performance is given by index, taking that of Comparative tire as 100. The larger the figure, the more excellent the high speed durability performance.

TABLE

Figure 7:
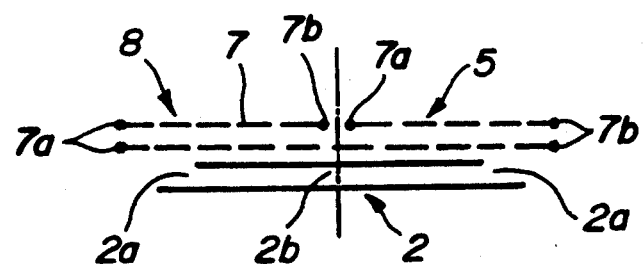

|  | Comparative tire | Invention tire |
|---|---|---|
| Arrangement of auxiliary layer | FIG. 7 | FIG. 2 |
| High speed durability performance | 100 | 115 |
| Trouble | Peeling at start end of auxiliary layer | Trouble occurred at portion other than ends of band member of auxiliary layer |

As shown in the test results mentioned above, the high speed durability performance of the test tire according to the present invention is largely improved as compared with Comparative tire.

As having been explained in the foregoing, according to the present invention, peeling is prevented from occurring in the rubber at end portions of the band strip of the auxiliary layer during running at high speed, and the high speed durability performance can be largely improved.

What is claimed is:

1. A pneumatic tire comprising; a pair of beads, a toroidal carcass composed of at least one carcass ply which extends between the beads and is composed of cords arranged substantially in a radial direction of the tire, a belt layer superimposed radially outside a crown portion of the carcass, a tread arranged radially outside the belt layer to cover the belt, and an auxiliary layer arranged between the tread and the belt layer to cover the entire belt layer and composed of an organic fiber cord arranged substantially in parallel with the tire circumferential direction, wherein the tread comprises a tread central portion containing a tire equatorial plate and extending over 30% of the tread width, a pair of tread side edge portions covering side edges of the belt layer each of said tread side edge portions extending over 15% of the tread width from a tread edge inward, and a pair of tread intermediate portions between the tread central portion and the tread side edge portions, the auxiliary layer consisting of two plies at at least axially width-wise opposite edge portions and composed of a continuous cord member composed of a ribbon-like cord member containing 2–12 rubberized thermally shrinkable cords, said auxiliary layer being formed by spirally winding said cord member from its one end located corresponding to one of said tread intermediate portions as a starting point toward one of the opposite side edges of the auxiliary layer in the axial direction; when the spirally wound cord member reaches said one of the opposite side edges, turning back and then spirally winding the cord member toward the other opposite side edge of the auxiliary layer; and when the spirally wound cord member reaches said other opposite side edge, turning back and then spirally winding the cord member until the cord member reaches a position corresponding to another tread intermediate portion which is symmetrical with the starting point through the tire equatorial plane or until the continuous cord member reaches substantially the starting point corresponding to said tread intermediate portion, both ends of said ribbon-like cord member having a shape cut at an angle with respect to the equatorial plane of said tire in the range of 20° to 60° and being separated from each other in the axial direction of said tire, and said tire having an aspect ration in the range of 0.35 to 0.6 defined by a tire sectional height to a tire sectional width.

2. A pneumatic tire according to claim 1, wherein the auxiliary layer comprises two plies at portions each corresponding to the tread portion from the side edges of the auxiliary layer to a location at which the end of the cord member of the auxiliary layer is located, and one ply at a portion between the locations in which the opposite ends of the core member are located, including the tread central portion.

3. A pneumatic tire according to claim 1, wherein the auxiliary layer comprises two plies over the entire width thereof, and is formed by winding the cord member from one of the opposite ends to the other end both being positioned in portions adjacent each other corresponding to one of the tread intermediate portions.

4. A pneumatic tire according to claim 1, wherein the cord member is constituted by a ribbon-like member containing ten rubberized nylon cords.

5. A pneumatic tire according to claim 1, wherein the rubberized cords of said auxiliary layer are made of nylon.

6. The pneumatic tire according to claim 1, wherein said tread comprises a plurality of land portions and circumferential grooves wherein opposite ends of said cord member of said auxiliary layer are respectively located radially inside land portions of said tread.

7. A pneumatic tire comprising; a pair of beads, a toroidal carcass composed of at least one carcass ply which extends between the beads and is composed of cords arranged substantially in a radial direction of the tire, a belt layer superimposed radially outside a crown portion of the carcass, a tread arranged radially outside the belt layer to cover the belt, and an auxiliary layer arranged between the tread and the belt layer to cover the entire belt layer and composed of an organic fiber cord arranged substantially in parallel with the tire circumferential direction, wherein the tread comprises a tread central portion containing a tire equatorial plate and extending over 30% of the tread width, a pair of tread side edge portions covering side edges of the belt layer each of said tread side edge portions extending over 15% of the tread width from a tread edge inward, and a pair of tread intermediate portions between the tread central portion and the tread side edge portions, the auxiliary layer consisting of two plies at at least axially width-wise opposite edge portions and composed of a continuous cord member composed of a ribbon-like cord member containing 2-12 rubberized thermally shrinkable cords, said auxiliary layer being formed by spirally winding said cord member from its one end located corresponding to one of said tread intermediate portions as a starting point toward one of the opposite side edges of the auxiliary layer in the axial direction; when the spirally wound cord member reaches said one of the opposite side edges, turning back and then spirally winding the cord member toward the other opposite side edge of the auxiliary layer; and when the spirally wound cord member reaches said other opposite side edge, turning back and then spirally winding the cord member until the cord member reaches a position corresponding to another tread intermediate portion which is symmetrical with the starting point through the tire equatorial plane or until the continuous cord member reaches substantially the starting point corresponding to said tread intermediate portion, both ends of said ribbon-like cord member separated from each other in the axial direction of said tire, and said tire having an aspect ratio in the range of 0.35 to 0.6 defined by a tire sectional height to a tire sectional width.

* * * * *